United States Patent
Aepli

(10) Patent No.: US 11,814,517 B2
(45) Date of Patent: Nov. 14, 2023

(54) REINFORCED THERMOPLASTIC MOULDING COMPOSITION

(71) Applicant: EMS-PATENT AG, Domat/Ems (CH)

(72) Inventor: Etienne Aepli, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 16 days.

(21) Appl. No.: 16/849,119

(22) Filed: Apr. 15, 2020

(65) Prior Publication Data

US 2020/0332118 A1 Oct. 22, 2020

(30) Foreign Application Priority Data

Apr. 16, 2019 (EP) ..................................... 19169464

(51) Int. Cl.
C08L 77/00 (2006.01)
C08K 7/14 (2006.01)

(52) U.S. Cl.
CPC ................ C08L 77/00 (2013.01); C08K 7/14 (2013.01); C08K 2201/003 (2013.01); C08K 2201/014 (2013.01)

(58) Field of Classification Search
CPC ..... C08L 77/00; C08K 7/14; C08K 2201/003; C08K 2201/014
See application file for complete search history.

(56) References Cited

U.S. PATENT DOCUMENTS

| | | | |
|---|---|---|---|
| 3,499,955 A | 3/1970 | Shannon et al. | |
| 2003/0158308 A1* | 8/2003 | Nay | C08G 69/28 524/239 |
| 2008/0119603 A1 | 5/2008 | Topoulos | |
| 2015/0048539 A1† | 2/2015 | Mitadera | |
| 2015/0274940 A1* | 10/2015 | Endtner | H01H 3/00 524/101 |
| 2015/0287493 A1* | 10/2015 | Aepli | C08K 3/013 252/509 |
| 2015/0291795 A1* | 10/2015 | Aepli | C08L 77/08 524/151 |
| 2016/0122511 A1* | 5/2016 | Bienmueller | B29C 49/0005 264/540 |
| 2017/0081473 A1* | 3/2017 | Benstead | C08G 69/265 |
| 2018/0022900 A1* | 1/2018 | Nakano | C08L 77/06 524/607 |
| 2020/0224028 A1* | 7/2020 | Yamada | C08L 67/06 |

FOREIGN PATENT DOCUMENTS

| | | | | |
|---|---|---|---|---|
| DE | 10352319 A1 | | 6/2004 | |
| EP | 0 957 131 A2 | | 11/1999 | |
| EP | 0 741 762 B2 | | 4/2004 | |
| EP | 2 615 139 A1 | | 7/2013 | |
| EP | 3 670 605 A1 | | 6/2020 | |
| JP | 3-269056 A | | 11/1991 | |
| JP | 5-279567 A | | 10/1993 | |
| JP | 6-32980 A | | 2/1994 | |
| JP | 2000-154316 A | | 6/2000 | |
| JP | 2004107536 A | * | 4/2004 | ............ C08G 69/02 |
| JP | 2011-132550 A | | 7/2011 | |
| JP | 2011132550 | † | 7/2011 | |
| JP | 4894982 B | * | 3/2012 | ............ C08L 77/06 |
| JP | 4894982 | † | 2/2015 | |
| WO | 94/22942 A1 | | 10/1994 | |
| WO | 2019/069805 A1 | | 4/2019 | |
| WO | 2019069805 | † | 4/2019 | |

OTHER PUBLICATIONS

English machine translation of JP4894982B. (Year: 2012).*
European Search Report for 19 169 464 dated Oct. 1, 2019.

\* cited by examiner
† cited by third party

*Primary Examiner* — John E Uselding
(74) *Attorney, Agent, or Firm* — Sughrue Mion, PLLC

(57) ABSTRACT

Polyamide moulding composition consisting of the following components
(A) 28.0-64.9 wt % of at least one polyamide,
(B) 15.0-40.0 wt % of glass fibres,
(C) 15.0-35.0 wt % of glass flakes having a particle thickness in the range of 0.3-2.0 μm,
(D) 0.1-2.0 wt % of heat stabilizer,
(E) 0-5.0 wt % of additives
with the proviso that the sum of components (B) and (C) is in the range of 35.0 to 65.0 wt %, based on the sum of components (A) to (E), and the sum of components (A) to (E) makes 100 wt %.

25 Claims, No Drawings

REINFORCED THERMOPLASTIC MOULDING COMPOSITION

TECHNICAL FIELD

The present invention relates to a glass fibre-reinforced polyamide moulding composition having good mechanical properties and good surface properties both in the dry state and in the conditioned state.

PRIOR ART

U.S. Pat. No. 3,499,955 describes the possibility of employing both glass fibres and glass flakes in a partly thermoplastic moulding composition with a crosslinking agent. The objective is as far as possible to include no vapours, and the matrix is subsequently crosslinked.

WO-A-94/22942 discloses polyamide moulding compositions which have been admixed both with glass fibres and with glass flakes. The matrix disclosed is exclusively aliphatic polyamide, and surface properties and mechanical properties are reported but without comparison between the dry state and the conditioned state.

EP-A-0741762 operates glass fibre-reinforced polyamide moulding compositions which are composed partly on the basis of mixtures of polyamide 66 and polyamide 6T/DT. Mechanical properties and surface properties both in the dry state and in the conditioned state are not compared.

DE-A-10352319 discloses a polyamide moulding composition which is coloured with carbon black, which comprises glass fibres and also particulate fillers, which is weathering-resistant and which has a jet black chromaticity. Used with preference are small-sized particulate fillers having a maximum diameter of 30 μm. As the examples show, the appearance of the shaped parts and also their weathering resistance are determined substantially by the properties of the carbon black used.

US-A-2008/0119603 describes materials for telephone housings based on polyamide with glass fibres and glass flakes. Data concerning the behaviour of the surface or the mechanical behaviour in the dry state compared with a conditioned state are not disclosed.

SUMMARY OF THE INVENTION

It is an object of the present invention, accordingly, to provide a polyamide moulding composition which is improved over the prior art. The aim in particular is preferably to provide good mechanical properties and good surface properties, in both the dry and the conditioned states. The moulding composition is preferably to possess sufficient stiffness and strength and at the same time high impact resistance and also to have good surface quality, including in the humid state. Specifically this means that the tensile elasticity modulus dry is to be preferably at least 15 000 MPa, and in the conditioned state is to be not more than 1500 MPa or more than 1100 MPa below the dry value. Additionally or alternatively, the breaking stress dry is to be preferably at least 150 MPa, preferably at least 200 MPa, and in the conditioned state not more than 50 MPa or more than 40 MPa below the dry value. Further additionally or alternatively, the impact resistance dry is to be preferably at least 50 kJ/m$^2$ or at least 60 kJ/m$^2$ and in the conditioned state not more than 15 kJ/m$^2$ or more than 12 k/m$^2$ below the dry value. These conditions for tensile elasticity modulus, breaking stress and impact resistance are preferably valid simultaneously. In relation to the mechanical properties, conditioning means that the specimens have been stored prior to the respective measurement for 14 days at 72° C. and a relative humidity of 62%. Additionally, preferably, the gloss measured at an angle of 60° in the dry state (DAM) and also after conditioning (80° C., 80% relative humidity, 120 h) is to be at least 70%.

This object is met by the polyamide moulding composition according to Claim 1.

A subject of the invention is therefore a polyamide moulding composition consisting of the following components (A) 28.0-64.9 wt % of at least one polyamide,
(B) 15.0-40.0 wt % of glass fibres,
(C) 15.0-35.0 wt % of glass flakes having a particle thickness in the range of 0.3-2.0 μm, in particular 0.4 to 1.7 μm,
(D) 0.1-2.0 wt % of heat stabilizer,
(E) 0-5.0 wt % of additives with the proviso that the sum of components (B) and (C) is in the range of 35.0 to 65.0 wt %, based on the sum of components (A) to (E). The sum of components (A) to (E) here makes 100 wt %.

The sum of components (B) and (C) is preferably in the range of 40.0-60.0 wt % and more preferably in the range from 42.0 to 57.0 wt % or 45.0-55.0 wt %, based in each case on the sum of components (A) to (E).

The moulding composition is preferably free from impact modifier, i.e. (E) contains no impact modifier.

Component (A):

Component (A) is composed of at least one polyamide, preferably at least one semicrystalline, aliphatic or semiaromatic polyamide, or consists of a mixture of polyamides, and more preferably of mixtures of at least one semicrystalline polyamide and at least one amorphous or microcrystalline polyamide.

The polyamide moulding composition contains preferably from 34.0-59.8 wt % and especially preferably 38.2-57.8 or 41.5-54.7 wt % of the at least one polyamide (A), based in each case on the sum of components (A) to (E).

The notations and abbreviations that are used here for polyamides and their monomers are laid down in the ISO standard ISO 16396-1:2015. Accordingly, among others, the following abbreviations are used for diamines: MXD for m-xylylenediamine, MPMD for 2-methyl-1,5-pentanediamine, MOD for 2-methyl-1,8-octanediamine, MACM for bis(4-amino-3-methyl-cyclohexyl)methane, PACM for bis(4-amino-cyclohexyl)methane, TMDC for bis(4-amino-3,5-dimethyl-cyclohexyl)methane, Bac for 1,3-bis(aminomethyl)cyclohexane, ND for 2,2,4-trimethylhexamethylenediamine and IND for 2,4,4-trimethyl hexamethylenediamine.

The present invention embraces polyamides both in a balanced endgroup ratio of the carboxyl and amino groups and polyamides having an unbalanced endgroup ratio of the carboxyl and amino groups, i.e. for which either the amino endgroups or the carboxyl endgroups are present in excess. In order to provide the polyamides with a particular endgroup configuration, it is preferable, for example, to use an excess of diamines or dicarboxylic acids during their preparation; in particular, the molar ratio of diamines to dicarboxylic acids is in the range from 0.90 to 1.10, more preferably from 0.94 to 1.06, very preferably in the range from 0.97 to 1.03. Additionally, for adjusting the endgroups of the polyamides, preference is given to using monofunctional additions of amines and monocarboxylic acids.

The quantity figures for the monomers should be understood to mean that a corresponding molar ratio of these monomers used in the polycondensation is also encountered in the polyamides prepared accordingly by polycondensation. Where a lactam or an aminocarboxylic acid is used, there is no excess of one component; instead, an amine or a carboxylic acid is deliberately to be added to the starting materials in order to adjust the endgroup ratio.

In one preferred embodiment the at least one polyamide (A) is selected from the group consisting of semicrystalline and amorphous polyamides or mixtures thereof.

The at least one polyamide (A) is preferably a semicrystalline polyamide or a mixture of semicrystalline polyamides. Preference will also be given to designing component (A) as a mixture of semicrystalline and amorphous polyamides. Mixtures of at least two amorphous polyamides are also suitable as component (A).

Semicrystalline polyamides referred to here differ from amorphous polyamides in having a pronounced melting point (or melting temperature), which may be determined, for example, by way of the heat of fusion, using differential scanning calorimetry (DSC). Semicrystalline plastics may, for example, have a crystalline fraction of 10 to 80% and may have both a glass transition temperature, below which the amorphous phase becomes frozen in, and a melting temperature, at which the crystalline phase dissolves. The melting point of the semicrystalline polyamides is preferably in the range of 160 to 330° C., more preferably in the range from 170 to 300° C. and more particularly in the range from 175 to 280° C., determined in each case in accordance with ISO 11357-3:2013 with a heating rate of 20 K/min. The semicrystalline polyamides preferably have an enthalpy of fusion, determined according to ISO 11357-3:2013, of >30 J/g.

Amorphous polyamides referred to here, in contrast, have no determinable melting point and possess merely a glass transition temperature. Whereas semicrystalline polyamides are opaque, the amorphous polyamides differ from them in their transparency. The amorphous polyamides preferably exhibit a heat of fusion of less than 5 J/g in differential scanning calorimetry (DSC) according to ISO 11357-3:2013 with a heating rate of 20 K/min. Amorphous polyamides possess no melting point, on account of their amorphicity.

The microcrystalline polyamides referred to here may be regarded as a link between the semicrystalline and the amorphous polyamides. Microcrystalline polyamides are semicrystalline polyamides and therefore possess a melting point. Their morphology, however, is such that the dimension of the crystallites is so small that a plate produced therefrom with a thickness of 2 mm is still transparent. i.e. their luminous transmittance is at least 75%, measured according to ASTM D 1003:2013. In differential scanning calorimetry (DSC) according to ISO 11357-3:2013 with a heating rate of 20 K/min, the microcrystalline polyamides preferably exhibit a heat of fusion of 5 to 30 J/g. Where polyamides are referred to here as being microcrystalline, they are indeed fundamentally semicrystalline, but possess the heat of fusion indicated above.

The glass transition temperature of the amorphous or microcrystalline polyamide is preferably 40 to 220° C., more preferably 60 to 200° C., very preferably 100 to 170° C., measured according to ISO 11357-2:2013 with a heating rate of 20 K/min.

For the purposes of preferred embodiments of the present invention, consideration is given below to preferred semicrystalline polyamides on the one hand, and also, collectively, to preferred amorphous and microcrystalline polyamides.

Exemplary and particularly preferred semicrystalline polyamides (A1: aliphatic, A2: semiaromatic) are selected here from the group consisting of PA 6, PA 46, PA 49, PA 410. PA 411, PA 412, PA 413, PA 414, PA 415, PA 416, PA 418, PA 436, PA 56, PA 510, PA 66, PA 69, PA 610, PA 611, PA 612, PA 613, PA 614, PA 615, PA 616, PA 617, PA 618, PA 1010, PA 1011, PA 1012, PA 1013, PA 1014, PA 1015, PA 1016, PA 66/6, PA 6/66/610, PA 6/66/12, PA 6/12, PA 11, PA 12, PA 912, PA 1212, PA MXD6, PA MXD9, PA MXD10, PA MXD11, PA MXD12, PA MXD13, PA MXD14, PA MXD15, PA MXD16, PA MXD17, PA MXD18, PA MXD36, their copolyamides or their mixtures, blends or alloys, polyamides having a 4T repeat unit, polyamides having a 5T repeat unit, polyamides having a 6T repeat unit, polyamides having an 8T repeat unit, polyamides having a 9T repeat unit, polyamides having a 10T repeat unit, PA 4T/6T, PA 4T/8T, PA 6T/8T, PA 4T/MPMDT, PA 4T/4I, PA 5T/5I, PA 6T/6I, PA 9T, PA 9T/MODT, PA 9T/9I, PA 10T, PA 10T/6T, PA 10T/610, PA 10T/612, PA 10T/11, PA 10T/12, PA 10T/6T/10I/6I, PA 12T, PA MPMDT/6T, PA 6T/6I (>50 mol % 6T), PA 10T/10I, PA 12T/12I, PA 4T/6T/8T, PA 4T/6T/10T, PA 4T/8T/10T, PA6T/8T/10T, PA 4T/6T/MPMDT, PA 6T/6, PA 6T/66, PA 4T/66, PA 5T/66, PA 6T/6I/6, PA 66/6I/6T, PA 10T/6T/1012/612, PA 6T/BacT/Bac6/66, PA 6T/610/BacT/Bac10. PA 6T/612/BacT/Bac12, PA 6T/BacT/6I/BacI, polyetheramides, polyetheresteramides, polyesteramides, and their mixtures or copolymers.

A copolyamide in the above sense refers to a polyamide having a plurality of the stated monomer units.

The relative viscosity of the semicrystalline polyamides (A1) and (A2) is preferably 1.40 to 2.70, more preferably 1.50 to 2.40, very preferably 1.60 to 2.20, measured on a solution of 0.5 g of polyamide in 100 ml of m-cresol at 20° C. in accordance with ISO 307:2013.

In the case of amorphous and/or microcrystalline polyamides (A3) it is preferred if they are selected from the group consisting of PA 6I, PA 6I/6T (>50 mol % 6I), PA 6/6T/6N, PA MXDI/6I, PA MXDI/MXDT/6I/6T, PA MXDI/12I, PA MXDI, PA MXDI/MXD6, PA MACM10, PA MACM12, PA MACM14, PA MACM18, PA NDT/INDT, PA TMDC10, PA TMDC12, PA TMDC14, PA TMDC18, PA PACM12, PA PACM14, PA PACM18, PA PACM10/11, PA PACM10/12, PA PACM12/612, PA PACM12/PACM14/612/614, PA MACMI/12, PA MACMT/12, PA MACM/MACM12, PA MACMI/MACMN, PA MACMT/MACM12, PA MACMT/MACMN, PA MACM36, PA TMDC36, PA MACMI/MACM36, PA 6I/MACMI/12, PA MACMT/MACM36, PA MACM/MACMT/12, PA 6I/6T/MACMI/MACMT, PA 6I/6T/MACMI/MACMT/12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM18/1018, PA 6I/6T/MACMI/MACMT/MACM12/612, PA 6I/6T/MACMI/MACMT/MACM12, PA MACMI/MACMT/MACM12/12, PA MACMI/MACMT/MACM12, PA 6I/6T/MACMI/MACMT/12, PA 6I/6T/6N/MACMI/MACMT/MACMN, PA TMDC12/TMDCT/TMDC36, PA TMDC12/TMDCI, PA TMDC12/TMDC/TMDC36 and PA TMDC12/TMDCT and mixtures or copolymers thereof, in which MACM may have been replaced entirely, preferably up to 50 mol % of the MACM, more particularly up to a maximum of 35 mol % of the MACM by PACM and/or TMDC, and/or the laurolactam may have been wholly or partly replaced by caprolactam. The above-stated systems PA 6T/6I (A2, semicrystalline) and PA 6I/6T (A3 amorphous) differ in that the fraction of 6T repeat units in the former polyamide is larger than the fraction of the 6I repeat units, whereas in the latter polyamide the opposite is the case.

Especially preferred are the polyamides 66, 610, 612, 0T/6T, 66/6I/6T, 6T/66/BacT/Bac6, 6I/6T and also MACMX and PACMX with X=10-16 and also the polyamides 11 and 12. Very particularly preferred are PA 66, PA 66/6I/6T, PA 6T/66/BacT/Bac6, PA 6I/6T/MACMI/MACMT/MACM12/612 and PA 10T/6T.

The relative viscosity of the amorphous or microcrystalline polyamides A3 is preferably 1.35 to 2.20, more preferably 1.40 to 2.10, very preferably 1.45 to 2.00, especially preferably 1.50 to 1.90, measured on a solution of 0.5 g of polyamide in 100 ml of m-cresol at 20° C. in accordance with ISO 307:2013.

Component (A) may also comprise mixtures of semicrystalline polyamides (A1) and/or (A2) and amorphous and/or microcrystalline polyamides (A3). The fraction of the semicrystalline polyamides in component (A) in this case is preferably 30.0 to 98.0 wt %, more preferably in the range from 40.0 to 95.0 wt % and very preferably in the range from 50.0 to 90.0 wt %, based in each case on the entirety of component (A).

These mixtures of semicrystalline polyamides (A1) and/or (A2) with amorphous or microcrystalline polyamides (A3) are preferably selected from the group consisting of mixtures of PA 66 with PA 6I/6T, of PA66 with PA 6T/66/BacT/Bac6, of PA66 with PA 6I/6T/MACMI/MACMT/MACM12/612, of PA 66/6I/6T with PA 6I/6T, of PA 66/616T with PA 6T/66/BacT/Bac6, of PA12 with PA MACM12, of PA12 with PA PACM12, and of PA66 with PA 6T/66/BacT/Bac6 and with PA 6I/6T/MACMI/MACMT/MACM12/612. In another particularly preferred embodiment of the polyamide moulding composition of the invention, component (A) comprises the mixture of at least one semicrystalline aliphatic polyamide (A1) and at least one semicrystalline semiaromatic polyamide (A2) based on the diamines 1,6-hexanediamine and bis(aminomethyl)cyclohexane, especially 1,3-bis(aminomethyl)cyclohexane, and also on the dicarboxylic acids terephthalic acid, isophthalic acid and/or two or more aliphatic dicarboxylic acids having 6 to 18 carbons. Particularly preferred aliphatic polyamides (A1) are PA66, PA610 and PA612; particularly preferred semiaromatic polyamides (A2) are 6T/66/BacT/Bac6, 6T/610/BacT/Bac10, 6T/612/BacT/Bac12 and 6T/BacT/6/BacI.

In another particularly preferred embodiment of the polyamide moulding composition of the invention, component (A) comprises semicrystalline polyamides (A1) or (A2) or mixtures thereof. Preference is given especially to the polyamides PA 66, PA 610, PA 612, PA 10T/6T, PA 66/6I/6T, PA 6T/66/BacT/Bac6, PA 6T/610/BacT/Bac10, PA 6T/612/BacT/Bac12, 6T/BacT/6I/BacI with a relative viscosity in the range from 1.60 to 2.30, and also mixtures thereof.

In another particularly preferred embodiment of the polyamide moulding composition of the invention, component (A) comprises the mixture of semicrystalline polyamides (A1) and/or (A2) with amorphous or microcrystalline polyamides (A3). Preference in this case is given especially, as semicrystalline polyamides (A), to PA 66, PA 610, PA 612, PA 616, PA12, and, as polyamides (A2), to PA 10T/6T and PA 66/6I/6T with a relative viscosity in the range from 1.60 to 2.30, and also, as amorphous or microcrystalline polyamides (A3), to PA 6I/6T, PA 6I/6T/MACMI/MACMT/MACM12/612, PA MACM12 and PA PACM12.

In accordance with the invention, therefore, preference as polyamides of component (A) is given in particular to the following polyamide mixtures:

Mixture (i):
 (A1) 50-90 wt % of semicrystalline aliphatic polyamide 66
 (A3) 10-50 wt % of amorphous semiaromatic polyamide 616T having 55 to 85 mol % of hexamethyleneisophthalamide units and 15 to 45 mol % of hexamethyleneterephthalamide units,
where the fractions of (A1) and (A3) make up 100 wt % of the polyamide mixture (A).

Mixture (ii):
 (A1) 50-90 wt % of semicrystalline aliphatic polyamide 66
 (A2) 10-50 wt/of semicrystalline semiaromatic polyamide 6T/66/BacT/Bac6, 6T/6I/BacT/BacI or 6T/66/6I/BacT/Bac6/BacI, where the diamine component is selected from 65 to 85 mole fractions of 1,6-hexanediamine and 15 to 35 mole fractions of bis(aminomethyl)cyclohexane, especially 1,3-bis(aminomethyl)cyclohexane, and the dicarboxylic acid component consists of 64 to 100 mole fractions of terephthalic acid, 0 to 18 mole fractions of isophthalic acid and also 0 to 18 mole fractions of one or more aliphatic dicarboxylic acids having 6 to 18 carbons, and where the respective sum of diamine component and dicarboxylic acid component is 100 mole fractions,
where the fractions of (A1) and (A2) make up 100 wt % of the polyamide mixture (A).

Mixture (iii):
 (A2) 50-90 wt % of semicrystalline semiaromatic polyamide 10T/6T
 (A3) 10-50 wt % of amorphous semiaromatic polyamide 6I/6T having 55 to 85 mol % of hexamethyleneisophthalamide units and 15 to 45 mol % of hexamethyleneterephthalamide units,
where the fractions of (A2) and (A3) make up 100 wt % of the polyamide mixture (A).

Mixture (iiii):
 (A1) 50-90 wt % of semicrystalline aliphatic polyamide 66
 (A2) 8-30 wt % of semicrystalline semiaromatic polyamide PA6T/BacT/6/Bac6, 6T/BacT/6I/BacI or 6T/BacT/6I/BacI/66/Bac6, where the diamine component is selected from 65 to 85 mole fractions of 1,6-hexanediamine and 15 to 35 mole fractions of bis(aminomethyl)cyclohexane, especially 1,3-bis(aminomethyl)cyclohexane, and the dicarboxylic acid component consists of 64 to 100 mole fractions of terephthalic acid 0 to 18 mole fractions of isophthalic acid and also 0 to 18 mole fractions of one or more aliphatic dicarboxylic acids having 6 to 18 carbons, and where the respective sum of diamine component and dicarboxylic acid component is 100 mole fractions,
 (A3) 2-20 wt % of amorphous polyamide 6I/6T/612/MACMI/MACMT/MACM12, where the composition comprises preferably 18-30 mol % each of 6I and 6T units, 12-26 mol % of 612 units, and also 6-16 mol % each of MACM12, MACMI and MACMT units, where the sum of all the PA units makes 100 mol %,
where the fractions of (A1), (A2) and (A3) make up 100 wt % of the polyamide mixture (A).

The polyamide moulding composition necessarily comprises, in the form of component (B), a fibrous reinforcing substance in the form of glass fibres, in a fraction of at least 15.0 weight percent and at most 40.0 weight percent.

According to one preferred embodiment, the polyamide moulding composition is characterized in that component (B) is present in a fraction, based on the sum of components (A)-(E), in the range of 17.0-35.0 wt %, preferably in the range of 18.0-32.0 wt %, or 20.0-30.0 wt %.

The glass fibres (B) in this case may have a circular cross section, especially preferably having a diameter in the range of 5-20 μm or in the range of 5-13 μm or 6-10 μm, or a non-circular cross section, in which case the dimensional ratio of the principal cross-sectional axis to the secondary cross-sectional axis perpendicular thereto is preferentially greater than 2.5, especially preferably in the range of 2.5-6 or 3-5.

The glass fibres (B) may be used for example in the form of short fibres (e.g. chopped glass with a length of 0.2-20 mm) or continuous filament fibres (rovings). The glass fibres (B) may have different cross-sectional areas, preference being given to glass fibres of circular cross section (round fibres) and of non-circular cross section (flat fibres).

Glass fibres with a circular cross section, i.e. round glass fibres, preferentially have a diameter in the range of 5-20 μm, preferably in the range of 5-13 μm and more preferably in the range of 6-10 sm. They are preferably used in the form of short glass fibres (chopped glass with a length of 0.2 to 20 mm, preferably 2-12 mm).

In the case of the flat glass fibres, i.e. glass fibres with non-circular cross-sectional area, use is made preferentially of those having a dimensional ratio of the principal cross-sectional axis to the secondary cross-sectional axis perpendicular thereto of more than 2.5, preferably in the range from 2.5 to 6, especially in the range from 3 to 5. These so-called flat glass fibres have a cross-sectional area which is oval, elliptical, elliptical with single or multiple necking (so-called cocoon fibre), polygonal, rectangular or nearly rectangular. A further preferred characterizing feature of the flat glass fibres used is that the length of the principal cross-sectional axis is preferably in the range from 6 to 40 μm, especially in the range from 15 to 30 μm, and the length of the secondary cross-sectional axis is in the range from 3 to 20 μm, especially in the range from 4 to 10 μm. At the same time the flat glass fibres have an extremely high packing density, meaning that the cross-sectional area of the glass fills an imaginary rectangle, surrounding the glass fibre cross section as precisely as possible, to an extent of at least 70%, preferably at least 80% and especially preferably at least 85%.

To reinforce the moulding compositions of the invention it is also possible to use mixtures of glass fibres with circular and non-circular cross sections, in which case the fraction of flat glass fibres is preferentially predominant, i.e. making more than 50 wt % of the overall mass of the fibres.

Preferably component (B) is selected from the group consisting of the following: E-glass fibres (these consist according to ASTM D578-00 of 52-62% silicon dioxide, 12-16% aluminium oxide, 16-25% calcium oxide, 0-10% borax, 0-5% magnesium oxide, 0-2% alkali metal oxides, 0-1.5% titanium dioxide and 0-0.3% iron oxide; preferably they have a density of 2.58±0.04 g/cm3, a tensile elasticity modulus of 70-75 GPa, a tensile strength of 3000-3500 MPa and an elongation at break of 4.5-4.8%), A-glass fibres (63-72% silicon dioxide, 6-10% calcium oxide, 14-16% sodium and potassium oxide, 0-6% aluminium oxide, 0-6% boron oxide, 0-4% magnesium oxide), C-glass fibres (64-68% silicon dioxide, 11-15% calcium oxide, 7-10% sodium and potassium oxide, 3-5% aluminium oxide, 4-6% boron oxide, 2-4% magnesium oxide), D-glass fibres (72-75% silicon dioxide, 0-1% calcium oxide, 0-4% sodium and potassium oxide, 0-1% aluminium oxide, 21-24% boron oxide), basalt fibres (mineral fibre with the approximate composition: 52% SiO2, 17% Al2O3, 9% CaO, 5% MgO, 5% Na₂O, 5% iron oxide and also other metal oxides), AR-glass fibres (55-75% silicon dioxide, 1-10% calcium oxide, 11-21% sodium and potassium oxide, 0-5% aluminium oxide, 0-8% boron oxide, 0-12% titanium dioxide, 1-18% zirconium oxide, 0-5% iron oxide) and also mixtures thereof.

One preferred embodiment of component (B) are high-strength glass fibres based on the ternary silicon dioxide-aluminium oxide-magnesium oxide system or on the quaternary silicon dioxide-aluminium oxide-magnesium oxide-calcium oxide system where the sum of the amounts of silicon dioxide, aluminium oxide and magnesium oxide is at least 78 wt %, preferably at least 87% and more preferably at least 92%, based on the overall glass composition.

Employed specifically is preferably a composition of 58-70 wt % silicon dioxide (SiO2), 15-wt % aluminium oxide (Al2O3), 5-15 wt % magnesium oxide (MgO), 0-10 wt % calcium oxide (CaO) and 0-2 wt % further oxides such as zirconium dioxide (ZrO2), boron oxide (B2O3), titanium dioxide (TiO2) or lithium oxide (Li2O), for example. In another embodiment the high-strength glass fibre possesses a composition of 60-67 wt % silicon dioxide (SiO2), 20-28 wt % aluminium oxide (Al2O3), 7-12 wt % magnesium oxide (MgO), 0-9 wt % calcium oxide (CaO) and also 0-1.5 wt % further oxides, such as, for example, zirconium dioxide (ZrO2), boron oxide (B203), titanium dioxide (TiO2), lithium oxide (Li2O).

In particular it is preferred for the high-strength glass fibre to have the following composition: 62-66 wt % silicon dioxide (SiO2), 22-27 wt % aluminium oxide (Al2O3), 8-12 wt % magnesium oxide (MgO), 0-5 wt % calcium oxide (CaO), 0-1 wt % further oxides, such as, for example, zirconium dioxide (ZrO2), boron oxide (B2O3), titanium dioxide (TiO2), lithium oxide (Li2O).

The high-strength glass fibre possesses a tensile strength of greater than or equal to 3700 MPa, preferably of at least 3800 or 4000 MPa, an elongation at break of at least 4.8%, preferably of at least 4.9 or 5.0%, and a tensile elasticity modulus of greater than 75 GPa, preferably of more than 78 or 80 GPa, with these glass properties being determined on individual fibres (pristine single filament) having a diameter of 10 m and a length of 12.7 mm at a temperature of 23° C. and a relative humidity of 50%. Specific examples of these high-strength glass fibres of component (B1) are S-glass fibres from Owens Corning with 995 size, T-glass fibres from Nittobo, HiPertex from 3B, HS4-glass fibres from Sinoma Jinjing Fiberglass, R-glass fibres from Vetrotex and S-1- and S-2-glass fibres from AGY. The glass fibres (continuous filament fibres) used in the form of roving, for example, preferentially have a diameter (for round glass fibres) or a secondary cross-sectional axis (for flat glass fibres) of 6 to 20 μm, preferably of 12 to 18 μm, while the cross section of the glass fibres may be round, oval, elliptical, elliptical with single or multiple necking, polygonal, rectangular or nearly rectangular. Particular preference is given to so-called flat glass fibres where the ratio of the cross-sectional axes, i.e. a ratio of principal to secondary cross-sectional axis, is from 2.5 to 5. The continuous filament fibres can be produced from the varieties of glass described above, with preference being given to continuous filament fibres based on E-glass and high-strength varieties of glass. These continuous filament fibres are incorporated into the polyamide moulding compositions of the invention by known processes for the production of elongate longfibre-reinforced pellets, in particular by pultrusion processes, wherein the continuous filament fibre strand (roving) is fully saturated with the polymer melt and then is cooled and chopped. The elongate long-fibre-reinforced pellets obtained in this way, which preferably have a pellet length of 3 to 25 mm, especially of 4 to 12 mm, can be processed further to shaped parts by the customary processing methods (such as, for example, injection moulding, compression moulding).

Preferred as component (B) are glass fibres of E-glass, with a non-circular cross section (flat fibres) and with an axial ratio of the principal cross-sectional axis to secondary cross-sectional axis of at least 2.5, and/or high-strength glass fibres with a circular or non-circular cross section and a glass composition based substantially on silicon dioxide, aluminium oxide and magnesium oxide components, with the fraction of magnesium oxide (MgO) being 5-15 wt % and the fraction of calcium oxide being 0-10 wt %.

In the form of flat E-glass fibres, the glass fibres of component (B) preferably have a density of 2.54-2.62 g/cm3, a tensile elasticity modulus of 70-75 GPa, a tensile strength of 3000-3500 MPa and an elongation at break of 4.5-4.8%, the mechanical properties having been determined on individual fibres with a diameter of 10 μm and a length of 12.7 mm at 23° C. and a relative humidity of 50%.

Particularly preferred as component (B) are glass fibres of E-glass with a circular cross section (round fibres) and with a diameter in the range from 6 to 10 μm.

The glass fibres of the invention may have been provided with a size which is suitable for thermoplastics, especially for polyamide, and which comprises an adhesion promoter based on aminosilane or epoxysilane compound.

The polyamide moulding composition preferably contains from 16.0 to 33.0 wt %, more preferably 18.0 to 32.0 wt %, more preferably 20.0 to 30.0 wt % of glass flakes (component (C)), based in each case on the sum of components (A) to (E).

The particle thickness of the glass flakes of component (C) is preferably in the range from 0.4 to 1.7 μm, more preferably in the range from 0.5 to 1.6 μm, especially preferably in the range from 0.5 to 1.5 μm. The particle thickness of the glass flakes preferably means the mean particle thickness. This mean particle thickness is obtained as the arithmetic mean from the determination of thickness on at least 100 individual glass flakes by scanning electron microscopy. With regard to the fluctuation spread of the particle thicknesses it is additionally preferred if at least 50 wt %, especially at least 70 wt %, of the glass flakes are contained within a particle thickness range which extends from half the mean particle thickness (0.5× mean particle thickness) to one and a half times the mean particle thickness (1.5× mean particle thickness). Preferred accordingly are glass flakes of component (C) which have a mean particle thickness in the range from 0.3 to 2.0 m, more preferably in the range from 0.4 to 1.7 μm, more preferably in the range from 0.5 to 1.6 μm and especially preferably in the range from 0.5 to 1.5 μm.

Glass flakes are thin, transparent, platelet-shaped pieces of glass of irregular form with a broad particle size distribution and a high aspect ratio (ratio of mean particle diameter to particle thickness). The variation in particle thickness within one type of glass flake is minimal. The individual glass particles have a customary particle size of 10 to 2000 or 10 to 4000 μm with a mean particle diameter (D50) in the range of 20-300, 30-300 or 15-600 μm. This and the dimensions described earlier on above should be understood as being based on the starting material and/or on the glass flakes in the moulding composition. Conventional glass flakes, which are used primarily in paints or coatings for corrosion control or for reinforcing plastics, possess a thickness of 3 to 7 μm. The glass flakes are produced for example by the shattering of glass bubbles or by breaking up a liquid glass melt in a centrifuge and subsequently comminuting the ribbon-like pieces of glass. They are characterized on the basis of their particle size distribution, the mean particle diameter and the thickness of the glass particles. Moreover, the glass flakes may be produced from different varieties of glass, as for example E-glass, S-glass, ECR-glass and C-glass. An example of a typical representative of the thick glass flakes is Microglas REF-160 A from NGF Europe, whose particle size distribution is as follows: 10% of the glass particles have a diameter of 300-1700 μm, 65% have a diameter in the range of 45-300 μm and 25% have a particle diameter of less than 45 μm. The thickness here is 5 μm. The type of glass used is E-glass. The glass flakes may be surface-coated with various sizes in order to improve attachment to the polymeric matrix, such as with aminosilanes or epoxysilanes, for example. The glass flakes used in the invention, while preferably having approximately the above-stated mean particle diameters and particle size distribution, nevertheless have a greater aspect ratio and hence a much lower particle thickness. The thickness of the glass flakes of the invention is only 0.3 to 2.0 μm. These very thin glass flakes are currently used exclusively in cosmetology and in effect pigment coatings for vehicles. Examples of very thin glass flakes of this kind are on the one hand the E-glass type MEG160FY-M03 from Nippon Sheet Glass Co. (JP), having a mean particle diameter (d50) of 160 μm, a thickness of 0.7 μm, and a particle size distribution of 20% of the glass particles in the range of 2000-1400 μm, with 60% in the range of 150-1400 μm and with 20% smaller than 150 μm and with a coating of 3-aminopropyltriethoxysilane, or, on the other hand, the E-glass flake type GF100E-A from Glass Flake Ltd., having a mean particle diameter of 160 μm, a particle size distribution with 80% of the glass particles in the range of 150-1700 μm and 20% smaller than 150 μm, with a particle thickness of 1.0 to 1.3 μm and with a coating of 3-aminopropyltriethoxysilane. Also suitable is the ECR-glass flake type GF100MECR-A from Glass Flake Ltd. with a mean particle diameter of 120 μm, a particle size distribution with 10% of the glass particles in the range of 300-1000 μm, with 65% in the range of 50-300 μm and 25% smaller than 50 μm, having a particle thickness of 1.0 to 1.3 μm and a coating of 3-aminopropyltriethoxysilane.

It is preferred here if the glass flakes consist of E-, S-, C- or ECR-glass; glass flakes of E-glass are particularly preferred.

The glass flakes may differ in particle size according to whether they are ground, micronized or unground. Preference is given to mean particle diameters (D50) of 20 to 300 μm, more preferably of 50 to 200 μm and especially preferably of 80 to 170 μm. The mean particle diameter stated for the glass flakes is based on the raw material used (component (C)) and/or on the completed moulding composition, and was determined by means of laser diffraction particle size analysis.

The glass flakes used preferably possess a coating based on aminosilanes, vinylsilanes, epoxysilanes or acrylosilanes; a surface coating with aminosilanes is particularly preferred. The amount of silane is preferably 0.1 to 1.0 wt %, more preferably 0.3 to 0.9 wt %, based on the amount of the glass flakes.

The polyamide moulding composition also comprises, in the form of component (D), heat stabilizers, different from the other constituents (B), (C) and (E), in a fraction of 0.1 to 2.0 percent by weight. Component (D) is present preferentially in a fraction, based on the sum of components (A)-(E), in the range of 0.2-2.0 wt %, especially preferably in the range of 0.2-1.8 or 0.3-1.5 wt %.

This component (D) may, according to one preferred embodiment, be selected from the following group:

Compounds of mono- or divalent copper, especially salts of mono- or divalent copper with inorganic or organic acids or mono- or dihydric phenols, the oxides of mono- or divalent copper, or the complex compounds of copper salts with ammonia, amines, amides, lactams, cyanides or phosphines, preferably Cu(I) or Cu(II) salts of hydrohalic acids, of hydrocyanic acids or the copper salts of aliphatic carboxylic acids, very preferably the monovalent copper compounds CuCl, CuBr, CuI, CuCN and Cu2O, and also the divalent copper compounds CuCl2, CuSO4, CuO, copper(I)acetate or copper(II)stearate, or mixtures of these compounds, where these copper compounds are used as such or preferentially in the form of concentrates. A concentrate here refers to a polymer, preferably of the same or substantially the same chemical nature as component (A), which comprises the copper salt or the copper compound in a high concentration. Especially, preferentially, the copper compounds are used in combination with further metal halides, including alkali metal halides, such as NaI, KI, NaBr, KBr, where the molar ratio of metal halide to copper is 0.5 to 20, preferably 1 to 10 and more preferably 2 to 7;

Stabilizers based on secondary aromatic amines;
Stabilizers based on sterically hindered phenols;
Phosphites and phosphonites; and also
Mixtures of the aforesaid stabilizers.

Preferentially, therefore, the compounds in question are compounds of monovalent or divalent copper, examples being salts of mono- or divalent copper with inorganic or organic acids or with mono- or dihydric phenols, the oxides of mono- or divalent copper, or the complex compounds of copper salts with ammonia, amines, amides, lactams, cyanides or phosphines, preferably Cu(I) or Cu(II) salts of hydrohalic acids, of hydrocyanic acids, or the copper salts of aliphatic carboxylic acids. Particularly preferred are the monovalent copper compounds CuCl, CuBr, Cu, CuCN and Cu2O, and also the divalent copper compounds CuCl2, CuSO4, CuO, copper(II)acetate or copper(II)stearate.

The copper compound may be used as it is or in the form of concentrates. A concentrate in this context is a polymer, preferably of the same chemical nature as component (A), which comprises the copper salt at high concentration. The copper compounds are used advantageously in combination with other metal halides, especially alkali metal halides, such as NaI, KI, NaBr, KBr, where the molar ratio of metal halide to copper is 0.5 to 20, preferably 1 to 10 and more preferably 2 to 7. Preference is given to using a combination of CuI and KI with a total concentration, based on the moulding composition, of 0.1 to 0.7 wt %, especially of 0.2 to 0.5 wt %.

Likewise possible are stabilizers based on secondary aromatic amines, in which case these stabilizers are present preferably in an amount of 0.2 to 2, preferably of 0.2 to 1.5 wt %.

Additionally possible are stabilizers based on sterically hindered phenols, in which case these stabilizers are present preferably in an amount of 0.1 to 1.5, more preferably of 0.2 to 1.0 wt %. Also possible are phosphites and phosphonites.

Likewise possible are mixtures of the above-stated heat stabilizers.

Particularly preferred examples of stabilizers which can be used in the invention and are based on secondary aromatic amines are adducts of phenylenediamines with acetone (Naugard A), adducts of phenylenediamine with linolene, Naugard 445, N,N'-dinaphthyl-p-phenylenediamine, N-phenyl-N'-cyclohexyl-p-phenylenediamine, or mixtures of two or more thereof.

Preferred examples of stabilizers which can be used in the invention and are based on sterically hindered phenols are N,N'-hexamethylene-bis-3-(3,5-di-tert-butyl-4-hydroxyphenyl)propionamide, glycol bis-(3,3-bis-(4'-hydroxy-3'-tert-butylphenyl)butanoate), 2,1'-thioethylbis-(3-(3,5-di-tenbutyl-4-hydroxyphenyl)propionate), 4,4'-butylidene-bis-(3-methyl-6-tert-butylphenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris-(tert-butylphenyl)) pentaerythritol diphosphite, tristearyl sorbitol triphosphite, tetrakis(2,4-di-tert-butylphenyl) 4,4'-biphenylene diphosphonite, 6-isocctyloxy-2,4,8,10-tetra-tert-butyl-12H-dibenzo-[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl) methyl phosphite and bis(2,4-di-tert-butyl-6-methylphenyl) ethyl phosphite. Especially preferred are tris[2-tert-butyl-4-thio(2'-methyl-4'-hydroxy-5'-tert-butyl)phenyl-5-methyl] phenyl phosphite and tris(2,4-di-tert-butylphenyl) phosphite (Hostanox® PAR24: commercial product of Clariant, Basel).

A preferred embodiment of the heat stabilizer is the combination of Irgatec NC 66 (available from BASF) and a copper stabilization based on CuI and KI. Especially preferred is a heat stabilization based exclusively on CuI and KI.

Apart from the use of organic heat stabilizers and/or of copper or copper compounds, the use of further transition metals or further transition metal compounds from groups VB, VIB, VIIB and/or VIIIB of the periodic table is preferably excluded.

According to a further preferred embodiment, the heat stabilizers of component (D) are selected from the group of phenol-based heat stabilizers, phosphite-based heat stabilizers, amine-based heat stabilizers, or mixtures or combinations thereof, and component (D) is especially preferably selected from the following group: triethylene glycol bis(3-tert-butyl-4-hydroxy-5-methylphenyl)propionate, pentaerythritol tetrakis(3-(3,5-di-tert-butyl-4-hydroxyphenyl) propionate), N,N'-hexamethylenebis[3-(3,5-di-t-butyl-4-hydroxyphenyl)propionamide], tris(2,4-di-tert-butylphenyl) phosphite, or mixtures thereof.

Preferred organic stabilizers are phenol compounds and/ or phosphite compounds, such as, for example, Irganox 245, Irganox 1010, Irganox 1098, Hostanox PAR 24 or Irgafos 168. Particularly preferred as component (D) is a mixture of 10 parts by weight of a mixture of Irganox 1010 (CAS 6683-19-8, phenolic antioxidant) and Anox 20 (CAS 6683-

19-8, phenolic antioxidant) in a ratio of 7:3 and also 2 parts by weight of Hostanox PAR24 (CAS: 31570-04-4, tris(2,4-di-tert-butylphenyl) phosphite), with the concentration being 0.3 to 1.5 wt %, based on the sum of components (A) to (E).

The polyamide moulding composition optionally comprises, in the form of component (E), further auxiliaries and/or additives as well, different from the other constituents (A)-(D), in a fraction of preferably at most 4 percent by weight.

According to one preferred embodiment, component (E) is present in a fraction, based on the sum of components (A)-(E), in the range of 0-4.0 wt %, more preferably in the range of 0-3.0 wt % and especially preferably in the range of 0-2.0 or 0.1-2.0 wt %.

Component (E) is selected preferentially from the following group: crystallization accelerators or retardants, flow aids, lubricants, mould release agents, pigments, dyes, taggants, processing aids, antistatics, carbon black, graphite, carbon nanotubes, residues from polymerization processes such as catalysts, salts and derivatives thereof. Preferentially component (E) is free from polyamides, especially semicrystalline, semiaromatic, aliphatic, microcrystalline or amorphous polyamides, and free from impact modifier.

As already elucidated earlier on above, the proposed polyamide moulding composition is characterized in particular in that, when processed to a shaped article, preferably by injection moulding or extrusion, it is suitable for applications particularly in the automotive and electrical/electronics sectors.

Correspondingly, the present invention also relates to shaped articles, preferably produced by injection moulding or extrusion, from a polyamide moulding composition as described above, or having at least a region or a coating of a polyamide moulding composition as described above.

The thermoplastic moulding compositions of the invention and, respectively, shaped articles produced from them are notable for good mechanical properties and good surface properties, both in the dry state and in the conditioned state. The shaped articles possess sufficient stiffness and strength and at the same time good impact resistance and also good surface quality, including in the humid state. The shaped articles in question are preferably those for which good surface quality is important. More particularly the shaped articles are selected from the group consisting of facing parts and/or visible housings, covers or frames. These shaped articles may be produced in a plurality of ways, for example by injection moulding or injection-compression moulding, or by extrusion. Also possible is the further machining of the shaped articles, such as, for example, milling, drilling, grinding, laser marking, laser welding or laser cutting, for example.

The polyamide moulding compositions of the invention find use in the production of shaped articles, especially parts of an electrical or electronic component, of a housing or of a housing constituent, preferably housings or housing parts for portable electronic devices, panels or covers, household appliances, household machines, spectacle frames, eyeglass surrounds, sunglasses, cameras, long-distance-vision glasses, decorative articles, devices and apparatus for telecommunications and consumer electronics, interior and exterior components in the automotive segment and in the sector of other means of transport, interior and exterior components, preferably with carrying or mechanical function, in the sectors of electricals, furniture, sport, mechanical engineering, sanitary and hygiene, medicine, energy and propulsion technology, especially preferably mobile phones, smartphones, organizers, laptop computers, notebook computers, tablet computers, radios, cameras, timepieces, calculators, sensor housings, measuring devices, playback devices for music or video, navigation devices, GPS devices, electronic picture frames, external hard drives and other electronic storage media.

Further embodiments are indicated in the dependent claims.

DESCRIPTION OF PREFERRED EMBODIMENTS

Preferred embodiments of the invention are described below with reference to the working examples, which serve merely for illustration and should not be interpreted as imposing any limitation.

Production of the Moulding Compositions and of the Test Specimens:

The moulding compositions with a constitution as in Tables 1 and 2 below were produced on a ZSK25 twin-screw extruder from Werner u. Pfleiderer. The various polyamide pellets were mixed together with the stabilizers and additives and metered into the intake zone. The fillers (glass fibre, mica, kaolin, calcium carbonate, hollow glass beads, and glass flakes) were metered into the polymer melt via a side feeder three barrel units before the die. The barrel temperature was set as an ascending profile up to 290° C. (for PA-4 and PA-5: up to 320° C.). Compounding was carried out at 200 rpm with a throughput of 15 kg/h. The extruded strands were pelletized after cooling in a water bath and the resulting pellets were dried at 10M° C. for 24 hours.

The test specimens were produced on an Arburg Allrounder 320-210-750 injection-moulding unit, with the cylinder temperatures set at 275 to 280° C. (for PA-4 and PA-5: up to 310° C.) and with a set screw speed of 250 rpm. The mould temperature was 100° C. (for PA-4 and PA-5: 130° C.).

Measurement of Properties:

The measurements were carried out according to the following standards and on the following test specimens:

Test specimens in the dry state after injection moulding are stored for at least 48 h at room temperature in a dry environment, i.e. over silica gel.

The conditioned test specimens, except for the test specimens for gloss measurement, are stored according to DIN EN ISO 1110:1998 for 14 days at 72° C. and 62% relative humidity.

The thermal behaviour, the melting point (Tm), the enthalpy of fusion ($\Delta Hm$) and the glass transition temperature (Tg) were determined on the pellets in accordance with ISO standard 11357-1, -2 and -3 (2013-04). The differential scanning calorimetry (DSC) was carried out with a heating rate of 20 K/min.

The relative viscosity ($\eta rel$) was determined according to DIN EN ISO 307 (2013-08) on solutions of 0.5 g of polymer dissolved in 100 ml of m-cresol at a temperature of 20° C. The sample was used in pellet form.

Tensile elasticity modulus, breaking stress and elongation at break were determined according to ISO 527 (2012-06) with a pulling speed of 1 mm/min (tensile elasticity modulus) or with a pulling speed of 5 mm/min (breaking stress, elongation at break) on the ISO tensile bar, standard ISO/CD 3167 (2014-11), type AI, 170×20/10×4 mm at 23° C. temperature, in the dry and conditioned states.

The Charpy impact resistance was determined in accordance with ISO 179/2*eU (1997, *2=instrumented) at 23° C.

on an ISO test bar, type B1 (mass 80×10×4 mm), produced according to the standard ISO/CD 3167 (2003), in the dry and conditioned states.

The gloss was determined on plates with dimension 60×60×2 mm, using Minolta Multi Gloss 268 instrument, at an angle of 60° and at a temperature of 23° C. according to ISO 2813 (2015-02). The gloss value is reported in dimensionless gloss units (GU). Test specimens in the dry state were stored after injection moulding for 48 h at room temperature in dry environment, i.e. over silica gel. For conditioning, the plates were stored for 120 hours at 85° C. and a relative humidity of 85%.

TABLE 1

| | | Inventive examples | | | | | | | |
|---|---|---|---|---|---|---|---|---|---|
| Components | Unit | B1 | B2 | B3 | B4 | B5 | B6 | B7 | B8 |
| PA-1 | wt % | 37.1 | 37.1 | 37.1 | 33.3 | 40.8 | | | 32.3 |
| PA-2 | wt % | 12.3 | 12.3 | 12.3 | 11.1 | 13.6 | | 12.3 | |
| PA-3 | wt % | | | | | | 49.4 | | |
| PA-4 | wt % | | | | | | | 37.1 | |
| PA-5 | wt % | | | | | | | | 12.3 |
| PA-6 | wt % | | | | | | | | 5.0 |
| Glass fibre type A | wt % | 25.0 | | | | 25.0 | | | |
| Glass fibre type B | wt % | | 25.0 | 20.0 | 25.0 | | 25.0 | 25.0 | 25.0 |
| Flake type A | wt % | 25.0 | 25.0 | 30.0 | 30.0 | 20.0 | 25.0 | 25.0 | 25.0 |
| Stabilizer | wt % | 0.6 | 0.6 | 0.6 | 0.6 | 0.6 | 0.6 | 0.6 | 0.4 |
| Elast. modulus (dry) | MPa | 15 900 | 16 000 | 15 700 | 17 200 | 15 300 | 15 900 | 15 400 | 15 500 |
| Elast. modulus (conditioned) | MPa | 14 900 | 15 100 | 14 700 | 16 400 | 14 300 | 15 700 | 15 540 | 15 200 |
| Breaking stress (dry) | MPa | 220 | 233 | 207 | 236 | 195 | 212 | 209 | 237 |
| Breaking stress (conditioned) | MPa | 186 | 195 | 178 | 201 | 178 | 188 | 205 | 205 |
| Elong. at break (dry) | % | 2.5 | 3.0 | 3.1 | 2.8 | 3.3 | 2.2 | 2.0 | 2.8 |
| Elong. at break (conditioned) | % | 2.4 | 2.9 | 3.0 | 2.8 | 3.2 | 2.0 | 2.0 | 2.8 |
| Impact resistance (dry) | kJ/m$^2$ | 74 | 85 | 78 | 78 | 82 | 70 | 65 | 86 |
| Impact resistance (conditioned) | kJ/m$^2$ | 71 | 74 | 73 | 73 | 77 | 65 | 63 | 80 |
| Gloss 60° (dry) | | 81 | 79 | 80 | 82 | 74 | 91 | 86 | 85 |
| Gloss 60° (conditioned, 85° C., 85% rh) | | 82 | 77 | 82 | 83 | 74 | 80 | 93 | 84 |

TABLE 2

| | | Comparative examples | | | | | | | | |
|---|---|---|---|---|---|---|---|---|---|---|
| Components | Unit | VB1 | VB2 | VB3 | VB4 | VB5 | VB6 | VB7 | VB8 | VB9 |
| PA-1 | wt % | 37.1 | 37.1 | 37.1 | 37.1 | 37.1 | | | 37.1 | 31.4 |
| PA-2 | wt % | 12.3 | 12.3 | 12.3 | 12.3 | 12.3 | 12.3 | | 12.3 | 12.0 |
| PA-3 | wt % | | | | | | | 49.4 | | |
| PA-4 | wt % | | | | | | 37.1 | | | |
| Glass fibre type A | wt % | | | | | | 50.0 | | | |
| Glass fibre type B | wt % | 20.0 | 20.0 | | 25.0 | 50.0 | | 50.0 | 25 | 18.0 |
| Mica | wt % | | | | 25.0 | | | | | |
| Kaolin | wt % | 30.0 | | | | | | | | |
| Calcium carbonate | wt % | | 30.0 | | | | | | | |
| Glass beads | wt % | | | 50.0 | | | | | | |
| Flake type B | wt % | | | | | | | | 25 | 28.0 |
| IMP | wt % | | | | | | | | | 10.0 |
| Stabilizer | wt % | 0.6 | 0.6 | 0.6 | 0.6 | 0.6 | 0.6 | 0.6 | 0.6 | 0.6 |
| Elast. modulus (dry) | MPa | 11 000 | 10 700 | 6 200 | 13 100 | 16 800 | 17 000 | 16 900 | 15 200 | 10 100 |
| Elast. modulus (conditioned) | MPa | 9 800 | 9 700 | 5 400 | 11 700 | 15 700 | 17 100 | 15 800 | 14 200 | 9 600 |
| Breaking stress (dry) | MPa | 154 | 166 | 85 | 166 | 235 | 222 | 227 | 201 | 103 |
| Breaking stress (conditioned) | MPa | 125 | 131 | 61 | 133 | 215 | 213 | 166 | 170 | 89 |
| Elong. at break (dry) | % | 2.3 | 2.4 | 7.9 | 1.9 | 2.4 | 1.8 | 2.4 | 2.5 | 2.2 |

TABLE 2-continued

Comparative examples

| Components | Unit | VB1 | VB2 | VB3 | VB4 | VB5 | VB6 | VB7 | VB8 | VB9 |
|---|---|---|---|---|---|---|---|---|---|---|
| Elong. at break (conditioned) | % | 2.2 | 2.3 | 8.0 | 1.9 | 2.7 | 1.8 | 3.1 | 2.3 | 2.5 |
| Impact resistance (dry) | $kJ/m^2$ | 41 | 44 | 21 | 44 | 78 | 62 | 55 | 40 | 38 |
| Impact resistance (conditioned) | $kJ/m^2$ | 33 | 38 | 20 | 40 | 75 | 60 | 48 | 34 | 39 |
| Gloss 60° (dry) | | 78 | 80 | 78 | 78 | 63 | 91 | 66 | 70 | 12 |
| Gloss 60° (conditioned, 85° C., 85% rh) | | 65 | 64 | 70 | 77 | 7 | 5 | 50 | 56 | 8 |

TABLE 3

Components and raw materials used

| Designation | Description | Manufacturer |
|---|---|---|
| PA-1 (type A1) | Polyamide 66, rel. viscosity: 1.84, melting point; 262° C., semicrystalline | Radici (IT) |
| PA-2 (type A3) | Semiaromatic copolyamide 6I/6T (67:33), rel. viscosity: 1.52, glass transition temperature: 125° C.. amorphous | EMS-CHEMIE (CH) |
| PA-3 (type A2) | Semiaromatic copolyamide PA66/6I/6T (70/20/10), rel. viscosity: 1.65, melting point: 234° C., semicrystalline | EMS-CHEMIE (CH) |
| PA-4 (type A2) | Semiaromatic copolyamide PA10T/6T (85:15), rel. viscosity: 1.72, melting point: 295° C., semicrystalline | EMS-CHEMIE (CH) |
| PA-5 (type A2) | Semiaromatic copolyamide PA6T/BacT/66/Bac6 (68.5/23.5/6/2), rel. viscosity: 1.62, melting point: 320° C., semicrystalline | EMS-CHEMIE (CH) |
| PA-6 (type A3) | Semiaromatic copolyamide 6I/6T/612/MACMI/MACMT/MACM12 (20/20/24/11/11/14), rel. viscosity: 1.73, glass transition temperature: 140° C., amorphous | EMS-CHEMIE (CH) |
| Glass fibre type A | Glass fibre CSG3PA-820 with flat cross section; cross-sectional axes at 28 μm and 7 μm. aspect ratio of axes = 4; length: 3 mm | Nittobo (IP) |
| Glass fibre type B | E-glass fibre ECT301HP with round cross section, diameter 10 μm, length: 4.5 mm | Chongqing Polycomp Int. Corp. (CN) |
| Mica | Muscovite mica SFG70, density: 2.83 $g/cm^3$ mean diameter: 7 μm (d98). aspect ratio: 30:1 | Aspanger Bergbau und Minetalwerke (AT) |
| Kaolin | Kaolin Translik 445, d10 = 0.998 μm, d50 = 3.353 μm, d90 = 11.875 μm, determined by light scattering with a Malvern mastersizer | BASF (DE) |
| Calcium carbonate | Millscarb, diameter: 3 μm (d50), density: 2.6-2.8 g/cm3 | Omya (CH) |
| Glass beads | E-glass beads 3000E CP-03, diameter: 30-50 μm | Potters Industries (US) |
| Stabilizer | 10 parts by weight of a mixture of Irganox 1010 (CAS 6683-19-8, phenolic antioxidant from BASF) and Anox 20 (CAS 6683-19-8, phenolic antioxidant from Addivant) in 7:3 ratio and 2 parts by weight of Hostamox PAR24 (CAS: 31570-04-4, tris(2,4-ditert-buty;phenyl) phosphite) | BASF (DE), Clariant (DE) |
| Glass flake type A | E-glass flakes MEG160FY-M03, particle diameter (d50): 160 μm, particle thickness: 0.7 μm, aminosilane sizing | Nippon Sheet Glass Co. (JP) |
| Glass flake type B | E-glass flakes Ref 160 A, particle diameter (d50) 160 μm, particle thickness. 5 μm, aminosilane sizing | NGF Europe (GB) |
| Impact modifier (IMP) | Fusabond N493. ethene-octette copolymer grafted with maleic anhydride | DuPont (US) |

Discussion of Results:

Examples B1-B8 with compositions according to the invention show consistently good mechanical properties, with small differences between dry and conditioned state (elasticity modulus, breaking stress, elongation at break, impact resistance). Good properties are also manifested in particular in the gloss, which in turn is largely independent of the dry or conditioned state. These properties are documented for different glass fibres contents and for glass fibres with round cross section (type B) and with flat cross section (type A). Flat glass fibres exhibit better properties especially in terms of gloss. The properties are also documented in the examples for different polyamide matrix compositions, with slightly different properties also being obtained depending on the composition; particularly good gloss values in the conditioned state are obtained for a mixture of amorphous 6I/6T with 10T/6T (B7), and particularly good gloss values in the dry state are obtained for a matrix exclusively of 66/6I/6T (16). Additionally, the properties are documented for different glass flake contents: a higher proportion of glass flakes may be used to increase elasticity modulus and breaking stress and also gloss; elongation at break and impact resistance can only just be held (compare B2 with B4, and B1 with B5).

VB1 to VB4 use alternative fillers to component (C) or (B) and (C). With VB1 and VB2, starting from a composition essentially such as that of B3, the glass flakes are replaced by kaolin and, respectively, calcium carbonate, with substantially the same proportions. The results are consistently poorer mechanical properties, and the gloss in the conditioned state deteriorates as well. In the case of example VB3, starting from example B3, the glass fibres and the glass flakes are replaced by glass beads. This results in poorer mechanical properties and poorer gloss. In the case of VB4, starting from B2, the glass flakes are replaced by mica, and here as well the resulting mechanical properties are consistently poorer and the resulting gloss is poorer. In the case of VB5, starting from B3, the glass flakes are replaced by glass fibres. The results are better values for elasticity modulus and breaking stress, poorer values for elongation at break, and similar values for impact resistance. In particular the gloss, especially conditioned, is very poor. Comparative example VB6 can be compared with B7—round glass fibres and glass flakes of B7 are replaced by flat glass fibres, and the results again are better values for elasticity modulus and breaking stress, poorer values for elongation at break, and similar values for impact resistance. The gloss, while good in the dry state, is nevertheless unacceptable in the conditioned state. In all of these comparative examples VB1 to VB4, therefore, in comparison with examples B1 to B5, there is a significantly lower stiffness (elasticity modulus), strength (breaking stress) and impact resistance, while the gloss, particularly in the dry state, may be entirely satisfactory, despite a significant drop in the conditioned values in some cases. V B5 to VB7, in which fillers used are exclusively glass fibres, are notable for good mechanical properties, with only the elongation at break being lower in these cases. Conversely, there is a dramatic change in the gloss values when the specimens are conditioned.

In VB8 and VB9, in addition to glass fibres, non-inventive glass flakes with a particle thickness of 5 μm are used. In a comparison of B2 with VB8, it becomes obvious that the mechanical properties are consistently poorer, especially the impact resistance. There is also a marked drop in the gloss after conditioning. Here, the positive influence of the thin glass flakes of the invention becomes apparent. On additional use of an impact modifier as in VB9, there is a dramatic reduction in the mechanical properties, including the impact resistance. The gloss as well drops to an unacceptable level with this use.

The invention claimed is:

1. A polyamide moulding composition consisting of the following components
   (A) 44.4-54.4 wt % of at least one polyamide,
   (B) 20-30 wt % of glass fibres,
   (C) 15.0-35.0 wt % of glass flakes having a particle thickness in the range of 0.3-2.0 μm,
   (D) 0.1-2.0 wt % of heat stabilizer, and
   (E) 0-5.0 wt % of additives
   with the proviso that the sum of components (B) and (C) is in the range of 35.0 to 65.0 wt %, based on the sum of components (A) to (E), and the sum of components (A) to (E) makes 100 wt %,
   wherein component (A) comprises (A2), which is 50-90 wt % of semicrystalline semiaromatic polyamide 10T/6T having 85 mol % of decamethyleneterephthalamide units and 15 mol % of hexamethyleneterephthalamide units with a relative viscosity measured on a solution of 0.5 g of polyamide in 100 ml of m-cresol at 20° C. in accordance with ISO 307:2013 in the range of 1.60-2.20 and (A3), which is 10-50 wt % of amorphous semiaromatic polyamide 6I/6T having 55 to 85 mol % of hexamethyleneisophthalamide units and 15 to 45 mol % of hexamethyleneterephthalamide units, with a relative viscosity measured on a solution of 0.5 g of polyamide in 100 ml of m-cresol at 20° C. in accordance with ISO 307:2013 in the range of 1.50-1.90, where the fractions of (A2) and (A3) make up 100 wt % of the polyamide mixture (A).

2. The polyamide moulding composition according to claim 1,
   wherein the mean particle diameter (d50) of component (C) is in the range of 20-300 μm; or
   wherein the particle thickness of component (C) is in the range from 0.4 to 1.7.

3. The polyamide moulding composition according to claim 1,
   wherein the sum of components (B) and (C), based on the sum of components (A)-(E), is in the range of 40.0-60.0 wt %.

4. The polyamide moulding composition according to claim 1,
   wherein the fraction of component (D) is in the range of 0.2-2.0 wt %, based on the sum of components (A) to (E).

5. The polyamide moulding composition according to claim 1,
   wherein component (D) comprises organic stabilizers; or
   wherein component (D) is selected from the following group consisting of:
   compounds of mono- or divalent copper;
   stabilizers based on secondary aromatic amines;
   stabilizers based on sterically hindered phenols;
   phosphites and phosphonites; and
   mixtures of the aforesaid stabilizers.

6. The polyamide moulding composition according to claim 1,
   wherein component (E) is present in a fraction, based on the sum of components (A)-(E), in the range of 0-4.0 wt %.

7. The polyamide moulding composition according to claim 1,
   wherein component (E) is selected from the group consisting of: crystallization accelerators or retardants, flow aids, lubricants, mould release agents, pigments, dyes, taggants, processing aids, antistatics, carbon black, graphite, carbon nanotubes, residues from polymerization processes including catalysts, salts and derivatives thereof.

8. The polyamide moulding composition according to claim 1,
   wherein the glass fibres of component (B) are E-glass fibres or S-glass fibres; and/or
   wherein the glass fibres of component (B) are glass fibres having a circular cross section, or
   wherein the glass fibres of component (B) are glass fibres having a non-circular cross section.

9. A polyamide moulding composition consisting of the following components
   (A) 28.0-64.9 wt % of at least one polyamide,
   (B) 15.0-40.0 wt % of glass fibres,
   (C) 15.0-35.0 wt % of glass flakes having a particle thickness in the range of 0.3-2.0 μm,
   (D) 0.1-2.0 wt % of heat stabilizer, and
   (E) 0-5.0 wt % of additives, with the proviso that the sum of components (B) and (C) is in the range of 35.0 to 65.0 wt %, based on the sum of components (A) to (E), and the sum of components (A) to (E) makes 100 wt %, wherein component (A) consists of one of the following mixtures:

(A1) is 50-90 wt % of semicrystalline aliphatic polyamide 66, (A2) is 8-30 wt % of semicrystalline semiaromatic polyamide PA6T/BacT/66/Bac6, 6T/BacT/6I/BacI or 6T/BacT/6I/BacI/66/Bac6, where the diamine component is selected from 65 to 85 mole fractions of 1,6-hexanediamine and 15 to 35 mole fractions of 1,3-bis(aminomethyl)cyclohexane, and the dicarboxylic acid component consists of 64 to 100 mole fractions of terephthalic acid, 0 to 18 mole fractions of isophthalic acid and also 0 to 18 mole fractions of one or more aliphatic dicarboxylic acids having 6 to 18 carbons, and where the respective sum of diamine component and dicarboxylic acid component is 100 mole fractions, and (A3) is 2-20 wt % of amorphous polyamide 6I/6T/612/MACMI/MACMT/MACM12, where the composition comprises 18-30 mol % each of 6I and 6T units, 12-26 mol % of 612 units, and also 6-16 mol % each of MACM12, MACMI and MACMT units, where the sum of all the PA units makes 100 mol %, where the fractions of (A1), (A2) and (A3) make up 100 wt % of the polyamide mixture (A).

10. The polyamide moulding composition according to claim 1,
wherein the glass fibres of component (B) are glass fibres having a circular cross section, having a diameter in the range of 5-20 μm, or
wherein the glass fibres of component (B) are glass fibres having a non-circular cross section, where the dimensional ratio of the principal cross-sectional axis to the secondary cross-sectional axis perpendicular thereto is greater than 2.5.

11. The polyamide moulding composition according to claim 1,
wherein the fraction of component (C) is in the range of 18.0-32.0 based on the sum of components (A) to (E).

12. The polyamide moulding composition according to claim 1,
wherein the mean particle diameter (d50) of component (C) is in the range of 50-200 μm; or
wherein the particle thickness of component (C) is in the range from 0.5 to 1.5 μm.

13. The polyamide moulding composition according to claim 1,
wherein the sum of components (B) and (C), based on the sum of components (A)-(E), is in the range of 42.0 to 57.0 wt %.

14. The polyamide moulding composition according to claim 1,
wherein the fraction of component (D) is in the range of 0.2-1.8, based on the sum of components (A) to (E).

15. The polyamide moulding composition according to claim 1,
wherein component (D) comprises organic stabilizers free from Cu oxide or Cu salts, or
wherein component (D) is selected from the group consisting of:
salts of mono- or divalent copper with inorganic or organic acids or mono- or dihydric phenols, the oxides of mono- or divalent copper, or the complex compounds of copper salts with ammonia, amines, amides, lactams, cyanides or phosphines or mixtures of these compounds;
stabilizers based on secondary aromatic amines;
stabilizers based on sterically hindered phenols;
phosphites and phosphonites; and also
mixtures of the aforesaid stabilizers.

16. The polyamide moulding composition according to claim 1,
wherein component (D) is selected from the group consisting of:
Cu(I) or Cu(II) salts of hydrohalic acids, of hydrocyanic acids or the copper salts of aliphatic carboxylic acids, or mixtures of these compounds, where these copper compounds are used as such or in the form of concentrates, where a concentrate refers to a polymer, of the same or substantially the same chemical nature as component (A), which comprises the copper salt in high concentration;
stabilizers based on secondary aromatic amines;
stabilizers based on sterically hindered phenols;
phosphites and phosphonites; and also
mixtures of the aforesaid stabilizers.

17. The polyamide moulding composition according to claim 1,
wherein component (D) is selected from the group consisting of:
monovalent copper compounds CuCl, CuBr, CuI CuCN and Cu2O, divalent copper compounds CuCl2, CuSO4, CuO, copper(II)acetate or copper(II)stearate, or mixtures of these compounds, where these copper compounds are used as such or in the form of concentrates, where a concentrate refers to a polymer of the same or substantially the same chemical nature as component (A), which comprises the copper salt in high concentration, and where the copper compounds are used in combination with further metal halides, including alkali metal halides, where the molar ratio of metal halide to copper is 0.5 to 20;
stabilizers based on secondary aromatic amines;
stabilizers based on sterically hindered phenols;
phosphites and phosphonites; and also
mixtures of the aforesaid stabilizers.

18. The polyamide moulding composition according to claim 1,
wherein component (E) is present in a fraction, based on the sum of components (A)-(E), in the range of 0-3.0 wt %.

19. The polyamide moulding composition according to claim 1,
wherein the glass fibres of component (B) fare glass fibres having a circular cross section, having a diameter in the range of 5-20 μm, or
wherein the glass fibres of component (B) are glass fibres having a non-circular cross section, where the dimensional ratio of the principal cross-sectional axis to the secondary cross-sectional axis perpendicular thereto is in the range of 2.5-6.

20. A polyamide moulding composition consisting of the following components
(A) 44.4-54.4 wt % of at least one polyamide,
(B) 20-30 wt % of glass fibres,
(C) 15.0-35.0 wt % of glass flakes having a particle thickness in the range of 0.3-2.0 μm,
(D) 0.1-2.0 wt % of heat stabilizer, and
(E) 0-5.0 wt % of additives with the proviso that the sum of components (B) and (C) is in the range of 35.0 to 65.0 wt %, based on the sum of components (A) to (E), and the sum of components (A) to (E) makes 100 wt %, wherein component (A) consists of semicrystalline semi-aromatic polyamide PA 66/6I/6T (70/20/10) with a relative viscosity measured on a solution of 0.5 g of polyamide in 100 ml of m-cresol at 20° C. in accordance with ISO 307:2013 in the range of 1.60-2.20, and wherein a gloss value of a test specimen made from the composition in gloss units measured at 60 degrees is within a range of 80%-91%, the gloss value being measured in a dry state after conditioning at 85° C. and 85% relative humidity for 120 h.

21. The polyamide moulding composition according to claim 1, wherein the component (A) is 49.4 wt %.

22. The polyamide moulding composition according to claim 20, wherein the component (A) is 49.4 wt %.

23. The polyamide moulding composition according to claim 1, wherein the component (B) is 25 wt %.

24. The polyamide moulding composition according to claim 1, wherein the component (A) is 25 wt %.

25. The polyamide moulding composition according to claim 20, wherein the component (A) is 25 wt %.

* * * * *